United States Patent [19]

Lasky

[11] Patent Number: 4,613,128
[45] Date of Patent: Sep. 23, 1986

[54] 3D DISPLAY

[75] Inventor: Richard J. Lasky, Wanaque, N.J.

[73] Assignee: Trans-World Manufacturing Corp., E. Rutherford, N.J.

[21] Appl. No.: 696,016

[22] Filed: Jan. 29, 1985

[51] Int. Cl.⁴ ............................................. A47F 11/06
[52] U.S. Cl. .................................... 272/8 M; 350/123; 350/137
[58] Field of Search ............... 272/8 M, 8 P, 8 D, 8.5, 272/10, 13; 40/219, 411, 489, 490, 491, 541, 577, 582, 611, 160, 900, 1; 434/76, 371; 350/123, 137, 138, 141, 143, 144, 172, 280, 283, 284

[56] References Cited

U.S. PATENT DOCUMENTS

| | | | |
|---|---|---|---|
| 894,599 | 7/1908 | Chaboty | 272/8.5 X |
| 1,019,141 | 3/1912 | Engelsmann | 272/8.5 X |
| 1,456,233 | 5/1923 | Hammond et al. | 350/123 X |
| 1,728,610 | 9/1929 | Horton | 272/8 M |
| 1,821,626 | 9/1931 | Fleischer | 272/8.5 X |
| 2,112,314 | 3/1938 | Spandau | 272/8.5 X |
| 2,903,805 | 9/1959 | Armentrout | 40/160 X |

FOREIGN PATENT DOCUMENTS

| | | | |
|---|---|---|---|
| 747979 | 4/1933 | France | 40/219 |
| 428159 | 5/1935 | United Kingdom | 272/8.5 |
| 711367 | 6/1954 | United Kingdom | 350/137 |
| 2031288 | 4/1980 | United Kingdom | 40/160 |

Primary Examiner—Robert A. Hafer
Assistant Examiner—Arnold W. Kramer
Attorney, Agent, or Firm—Ostrolenk, Faber, Gerb & Soffen

[57] ABSTRACT

A display device for creating the illusion of a three dimensional image is disclosed. The device includes a generally planar light transmitting surface having both a background image and an intermediate image formed thereon, the foreground image being in focus, the background scene or image being out of focus. A generally planar mirror has a foreground image located thereon and is maintained at an acute angle with respect to the light transmitting surface such that the light transmitting surface may be viewed by looking at the mirror along an axis which is within the acute angle. A light source is provided for projecting light through the light transmitting surface onto the mirror for reflection thereby.

8 Claims, 4 Drawing Figures

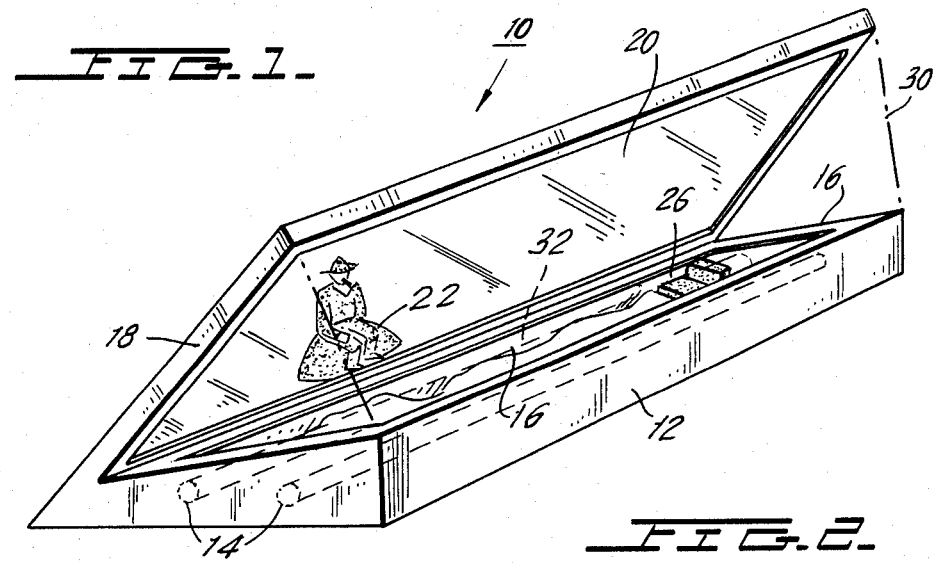
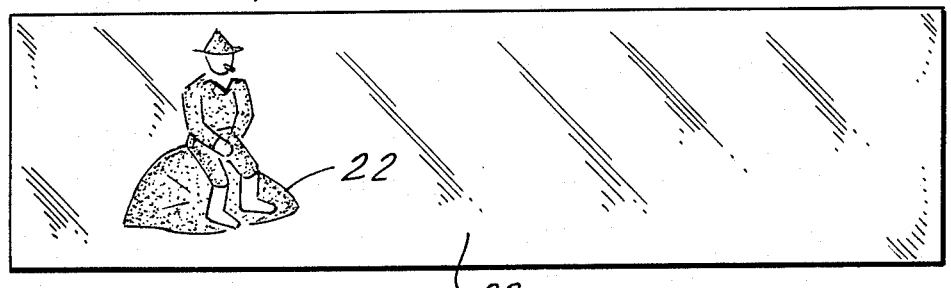
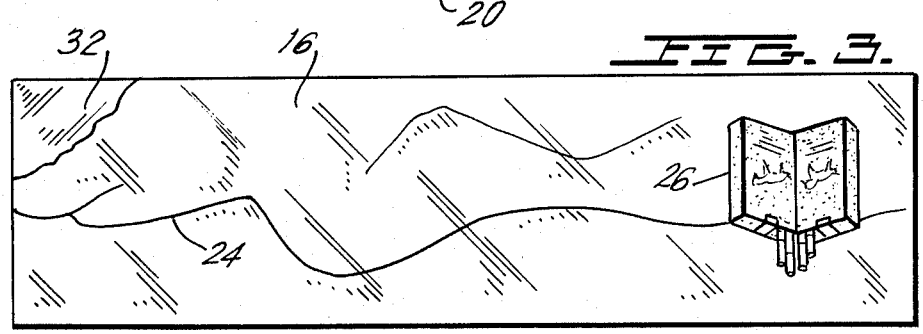
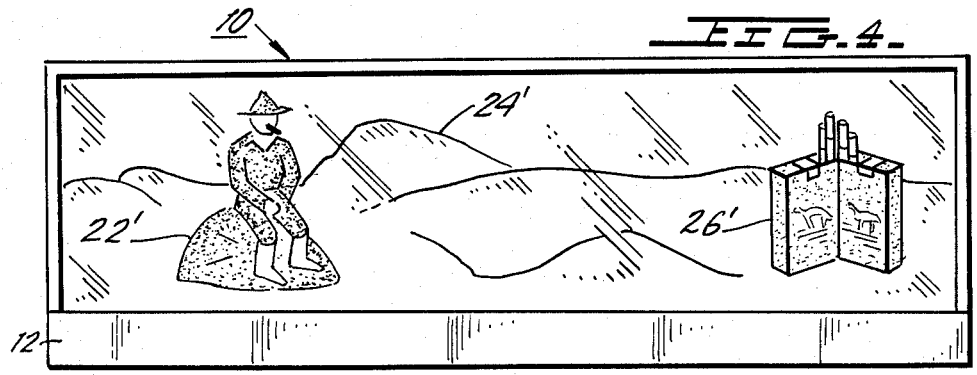

3D DISPLAY

BACKGROUND OF THE INVENTION

The present invention relates to a display for creating three dimensional images and, more particularly, to a display for creating the illusion of three spaced image planes. The present invention is an improvement of the display disclosed in U.S. patent application Ser. No. 508,552, filed June 28, 1983, now U.S. Pat. No. 4,544,218 assigned to the assignee of the present invention, the disclosure of which is incorporated herein by reference.

In the foregoing application, the illusion of a three dimensional image is created by providing a foreground image on a mirrored surface and a translucent background image on a light transmitting surface which is maintained at an acute angle with respect to the mirrored surface. A light source is provided below the light transmitting surface and serves to project the background image onto the mirrored surface so that an individual looking at the mirrored surface will view both the foreground image formed thereon and the background image reflected off of the mirrored surface. This creates the illusion of a three dimensional scene with the foreground and background images appearing to be located in separate image planes.

BRIEF DESCRIPTION OF THE INVENTION

In order to enhance the three dimensional effect of the foregoing display and to create the illusion of three separate image planes, the present invention provides two separate images on the light transmitting surface. The image which is to represent the background image plane is formed out of focus while the image which is to represent the intermediate image plane is formed in focus. These two images are projected onto the mirrored surface and out to the individual observing the display. Looking into the mirrored surface, the individual appears to see three image planes: a foreground image plane defined by the image formed on the mirrored surface, an intermediate image plane defined by the in focus image formed on the light transmitting surface, and a background image plane formed by the out of focus image formed on the light transmitting surface.

BRIEF DESCRIPTION OF THE DRAWINGS

For the purpose of illustrating the invention, there is shown in the drawings one embodiment which is presently preferred, it being understood, however that this invention is not limited to the precise arrangements and instrumentalities shown.

FIG. 1 is a perspective view of a three dimensional display constructed in accordance with the principles of the present invention.

FIG. 2 is a plan view of a mirrored surface of FIG. 1 having a foreground image formed thereon.

FIG. 3 is a plan view (partially removed) of the light transmitting surface of FIG. 1 having both the intermediate and background images formed thereon.

FIG. 4 is a front elevation of the display of the present invention showing diagramatically the composite scene which is transmitted.

DETAILED DESCRIPTION OF THE INVENTION

Referring now to the drawings, wherein like numerals indicate like elements, there is illustrated in FIG. 1 a three dimensional display constructed in accordance with the principles of the present invention and designated generally as 10. Display 10 includes a light box 12 preferably housing a plurality of flourescent lights 14 and supporting a light transmitting surface 16 located above the lights 14. A support structure 18 extends from the light box 14 and supports a mirror 20 at an acute angle with respect to the light transmitting surface 16.

As best shown in FIG. 2, a foreground image 22 (shown by way of example as a man sitting on a rock) is formed at the front surface of the mirror 20. In the presently preferred embodiment, the foreground image 22 is silk screened onto a thin Mylar ® substrate which is adhered to the front surface of the mirror 20. The silk screening preferably has a matte finish so that the background image 24 and/or the intermediate image 26 formed at the light transmitting surface 16 is not reflected off of the foreground image 22. In the presently preferred embodiment, the Mylar ® substrate is diecut so as to correspond to the outline of the lithographed image formed thereon as closely as possible. While the foreground image 22 is preferably formed on a plastic substrate which is adhered to the surface of mirror 20, the foreground image 22 may be formed at the front surface of mirror 22 in any other manner, for example by silk screening the image directly on the mirror 20.

As shown in FIG. 3, both the background image 24 and the intermediate image 26 are formed at the light transmitting surface 16. The background image 24 is out of focus while the intermediate image 26 is in focus. Both images are translucent so that they may be projected onto the mirror 20 by the lights 14 in the light box 12. In the presently preferred embodiment, the light transmitting surface 16 is defined by a thin styrene transparency which is supported on a plexiglass plate 32. Both the background image 24 and the intermediate image 26 are preferably formed on the styrene transparency by a lithographic process. The plate 32 can be omitted if other means are provided for supporting the transparency in a single plane. The images 24, 26 can be formed on the styrene or any other support surface using any suitable technique. In order to protect the images 22–26 from being damaged, a protective plexiglass shield 30 may be provided.

The composite image which will be seen by the viewer of the display 10 is illustrated in FIG. 4. As shown therein, the foregoing image 22, as at 22′, the reflection 24′ of the background image 24 and the reflection 26′ of the intermediate image 26 are all superimposed on one another. Due to the difference between the distance from the eye of the observer to the foreground image 22 and the distance from the eye of the observer to the intermediate image 26, these images appear to be in different planes. While the distance from the eye of the observer to both the intermediate image 26 and the background image 24 are identical, the fact that the background image 24 is out of focus creates the illusion that the background image 24 is further away from the viewer than the intermediate image 26. As a result, the viewer appears to see three separate image planes in a single view.

Although a preferred embodiment of the present invention has been described in detail by way of illustration only, many modifications and variations thereof will now be apparent to one skilled in the art, and, accordingly, the scope of this invention is to be limited not by the details of the preferred embodiment described herein, but only by the appended claims.

What is claimed is:

1. A display device, comprising:
   a generally planar light transmitting surface having both a background and an intermediate image located thereat, said intermediate image being in focus, said background image being out of focus;
   a generally planar mirror having a foreground image located thereat;
   first means for projecting light through said background and intermediate images onto said mirror for reflection thereby; and
   second means for maintaining said light transmitting surface at an acute angle with respect to said mirror such that said light transmitting surface may be viewed by looking at said mirror along an axis which is within said acute angle whereby said background, said foreground and said intermediate images are superimposed on each when viewed along said axis to create the illusion that said intermediate image is located behind said foreground image and said background image is located behind both said foreground image and said intermediate image, thereby creating a three dimensional scene.

2. The display device of claim 1, further including a light box, said light transmitting surface constituting one surface of said light box, said first means including a light source located in said light box.

3. The display device of claim 2, wherein said second means includes a support for said mirror which is integral with said light box.

4. The display device of claim 2, wherein said background and intermediate images are formed on a light transmitting image carrier positioned at said light transmitting surface.

5. The display device of claim 2, wherein said foreground image is formed on a sheet which is adhered to a front surface of said mirror.

6. The display device of claim 1, wherein said background and intermediate images are formed on a light transmitting substrate which is located on said light transmitting surface.

7. The display device of claim 1, wherein said mirror is a full reflecting mirror.

8. The display device of claim 1, wherein said foreground image is in focus.

* * * * *